US006617820B2

(12) United States Patent
Carlson et al.

(10) Patent No.: US 6,617,820 B2
(45) Date of Patent: Sep. 9, 2003

(54) AUXILIARY POWER CONVERSION BY PHASE-CONTROLLED RECTIFICATION

(75) Inventors: Douglas S. Carlson, Hawthorne, CA (US); Constantin C. Stancu, Anaheim, CA (US); James M. Nagashima, Cerritos, CA (US); Silva Hiti, Redondo Beach, CA (US); Khwaja M. Rahman, Torrance, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/947,294

(22) Filed: Sep. 7, 2001

(65) Prior Publication Data

US 2003/0048089 A1 Mar. 13, 2003

(51) Int. Cl.[7] ............... H02P 5/28; H02P 7/36
(52) U.S. Cl. ............ 318/727; 318/700; 318/801; 318/802; 318/811; 363/15; 363/16; 363/17; 363/98; 363/132
(58) Field of Search ................. 318/727, 801, 318/802, 811, 700; 363/15, 16, 17, 98, 132, 37, 39, 40, 41

(56) References Cited

U.S. PATENT DOCUMENTS

| 3,789,281 A | * | 1/1974 | Shibata ............... 318/696 |
| 4,417,193 A | * | 11/1983 | Hirata ................ 318/803 |
| 4,423,477 A | * | 12/1983 | Gurr .................. 363/54 |
| 5,151,641 A | * | 9/1992 | Shamoto ............... 318/762 |
| 5,350,994 A | * | 9/1994 | Kinoshita et al. ......... 320/15 |
| 5,642,270 A | * | 6/1997 | Green et al. ............ 363/21 |
| 5,659,237 A | * | 8/1997 | Divan et al. ............ 320/6 |
| 6,066,928 A | * | 5/2000 | Kinoshita et al. ........ 318/139 |
| 6,262,896 B1 | * | 7/2001 | Stancu et al. ............ 363/17 |

* cited by examiner

Primary Examiner—Robert E. Nappi
Assistant Examiner—Tyrone Smith
(74) Attorney, Agent, or Firm—Christopher DeVries

(57) ABSTRACT

A method of generating low voltage auxiliary power forms for electric or hybrid vehicle use by tapping power from the traction motor primary winding with a secondary winding and rectifier.

21 Claims, 1 Drawing Sheet

AUXILIARY POWER CONVERSION BY PHASE-CONTROLLED RECTIFICATION

This application is a continuation-in-part of U.S. Ser. No. 09/596,694 filed Jun. 19, 2000. The present invention relates generally to electric or hybrid electric vehicle control systems. More specifically, the present invention relates to a method and apparatus for providing auxiliary power conversion in an electric vehicle.

TECHNICAL FIELD

BACKGROUND OF THE INVENTION

In today's automotive market, there exist a variety of electric propulsion or drive technologies used to power vehicles. The technologies include electric traction drive systems utilizing batteries and/or fuel cells as an energy source, with a myriad of power converting technologies such as DC-DC converters, transformers, generators, and inverters used to provide electrical power at desired voltage and current levels and wave forms. An electric vehicle will require electrical sources at different voltage levels to operate different vehicle systems. For example, an electric traction motor will typically be operated at a high voltage level (200–450 volts), and accessory systems such as radios and door locks may be operated at a relatively low DC voltage (12–48 volts).

The plurality of voltage levels needed to operate an electric vehicle and its accessories require corresponding electrical converting equipment to transform the energy source in the vehicle to the desired voltage levels. In the past, multiple DC-DC converters have been used to provide low voltage DC power to power vehicle accessories. This plurality of electrical converting components adds cost and complexity to a vehicle. Thus, there is a need in the art of electrical vehicles to provide a simple cost-effective method for providing multiple voltage levels in an electric vehicle.

SUMMARY OF THE INVENTION

The present invention includes a method and apparatus to provide power to an electric traction motor in a vehicle and also to provide secondary low voltage for vehicle accessories. The present invention utilizes an electric traction motor having dual windings providing electrical energy/power to drive the electric traction motor and also providing a low voltage DC source for vehicle accessories. The electric traction motor is electrically coupled to an inverter that supplies time-varying current to a primary winding electric traction motor to electromagnetically vary the torque of the electric traction motor. A battery or fuel cell with a DC-DC converter provides a high voltage DC bus that is chopped by the inverter into the time-varying current.

A secondary winding included in the electric motor is electromagnetically coupled to the primary winding and time-varying current supplied by the inverter. The secondary winding has a turn ratio that allows the voltage supplied by the secondary winding to be less than that supplied by the primary winding. The output voltage of the secondary winding is then applied to a rectifier to be rectified into a DC voltage that may be used by vehicle accessories. As described previously, vehicle accessories typically operate on DC voltages in the range of 12 to 48 volts. The voltage supplied by the secondary winding will vary as the time-varying current applied by the inverter to the motor is changed to control the torque of the electric traction motor. To compensate for this voltage variation, the rectifier includes a bank of switching elements that is controlled in closed loop fashion to supply a desired voltage. In this manner, the DC voltage generated by the secondary winding and rectifier can be controlled in most cases regardless of the magnitude of the time-varying current applied to the primary windings of the electric traction motor. In operating conditions where the time-varying current supplied by the inverter to drive the electric motor drops below the necessary level to sustain the desired DC voltage output of the rectifier, a high frequency output generated by the inverter will provide the electrical energy necessary for the secondary winding and rectifier to generate the desired DC voltage.

The dual winding and controlled rectification of the electric traction motor of the present invention is a low cost, highly reliable solution to the problem of providing different voltage sources or levels in an electric vehicle.

DESCRIPTION OF THE PREFERRED EMBODIMENT

Figure 1:
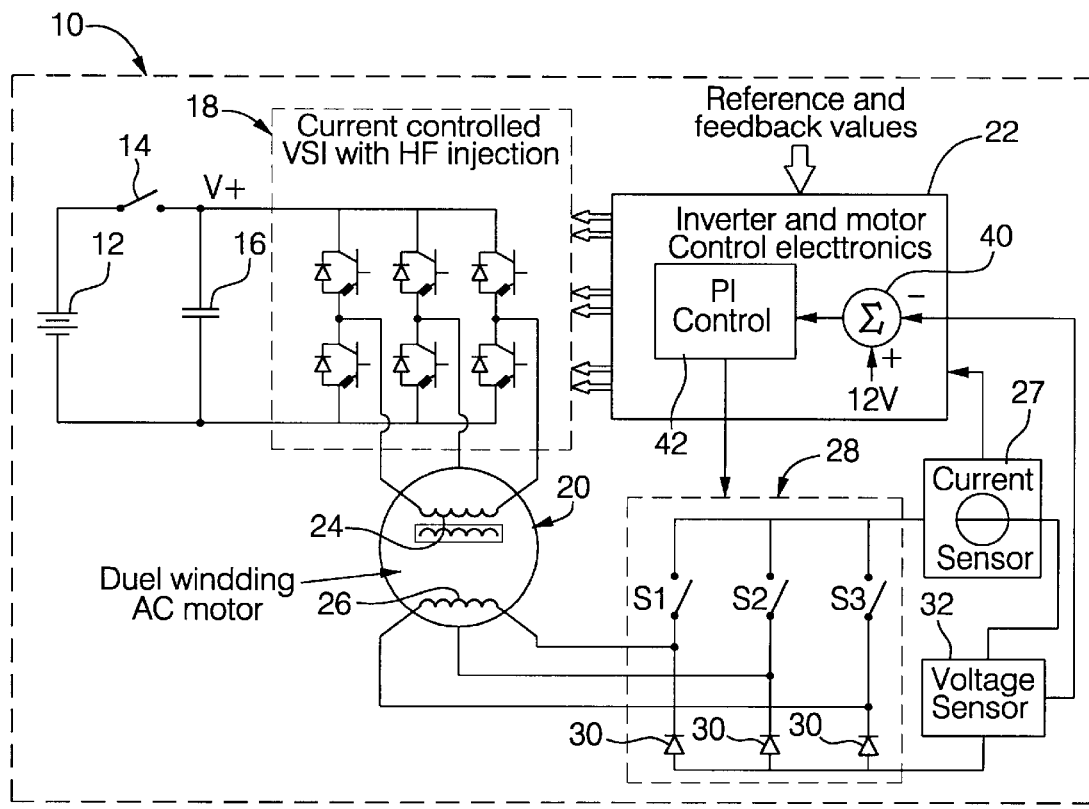
FIG. 1 is a diagrammatic drawing of the power system of the present invention.

FIG. 1 is a diagrammatic drawing of the power system of the present invention contained in a hybrid or electric vehicle 10. The power system includes a DC supply 12 such as a battery or fuel cell coupled to a DC-DC converter and a DC contactor 14 to generate a high voltage DC bus V+. The voltage V+ is preferably in the range of 200 to 450 volts, but may be varied to accommodate different vehicle power systems. The voltage V+ is supplied to a motor inverter 18 via a filtering capacitor 16. The motor inverter 18 chops or switches the provided DC voltage V+ to preferably generate three phase power for a dual winding electric traction motor 20. Inverter and motor control electronics 22 control the switching of the motor inverter 18 as a function of motor speed, position and/or torque. The control electronics 22 of the present invention may comprise any type of control module or vehicle controller known in the art, and are equipped with nonvolatile memory (NVM), random access memory (RAM), discrete and analog input/output (I/O), a central processing unit, communications interfaces for conventional and wireless (Bluetooth®) networking within an automotive communications network. The control electronics 22 may communicate with the motor inverter 18 using discrete signals, analog signals, or an automotive communications network. The inverter 18 is preferably controlled using a space vector approach to the motor windings at a fundamental frequency, typically between zero and 400 hertz.

The electric traction motor 20 used in the present invention is preferably an AC induction machine but may comprise any known electrical motor/generator technology, including, but not limited to, DC machines, synchronous machines, and switched reluctance machines. The electric traction motor 20 includes a primary winding or set of windings 24 on the motor stator coupled to the inverter 18 to receive the three phase time-varying current to create the magnetic fields that rotate the rotor of the electric traction motor 20. A secondary winding or set of windings 26 is electromagnetically coupled to the primary winding 24 on the motor stator and is wound with a turns ratio to provide a convenient voltage for rectification by a rectifier bridge 28. The secondary winding 26 is constructed so that each phase has a substantial leakage inductance of substantially 50 micro-henrys to 100 micro-henrys. This leakage inductance limits the current when each leg of the rectifier bridge 28 is turned on. This leakage inductance operates in discontinuous conduction, i.e., the current in each inductance returns to zero before the switch turns on in the next cycle.

The rectifier bridge 28 is preferably a three-phase rectifier with control switches S1, S2, S3 in the top three legs and diodes 30 in the bottom three legs of the rectifier bridge 28. The switches S1, S2, S3 are preferably silicon controlled rectifiers (SCRs) but may comprise any known electronic switching elements including, but not limited to, insulated gate bipolar transistors (IGBTs) and metal oxide semiconductor field effect transistors (MOSFETs). The conduction angle of the switches S1, S2, S3 is advanced or retarded in phase to control the output current and voltage of the rectifier bridge 28 by the control electronics 22. The output voltage of the rectifier bridge 28 is measured by a voltage sensor 32. The control electronics 22 may be used to implement a closed loop regulator for the output DC voltage of the rectifier bridge 28 by adjusting the switching or conduction of the switches S1, S2, S3 in response to feedback from a voltage sensor 32.

The desired DC voltage output of the rectifier bridge 28 and the voltage feedback provided by the voltage sensor 32 are subtracted at summing junction 40 to generate an error. The error is input to proportional/integral (PI) control block 42 to generate discrete output to switches S1, S2, S3. In this manner, the switches S1, S2, S3 will be modulated to provide the desired DC output voltage from the rectifier bridge 28.

In the present invention, the output current of the rectifier bridge 28 is measured by current sensor 27, and the inverter 18 is commanded by the control electronics 22 to compensate for the amount of current drawn by the secondary winding 26, keeping the net current used for motoring constant and negating any torque ripple that would otherwise be caused by the power drawn from the secondary winding 26.

During the operation of the power system of the present invention below the base speed of the motor 20, the stator voltage is directly proportional to motor speed or RPM. As motor RPM decreases, an operating condition may occur where the secondary output voltage generated by the secondary winding 26 and rectifier bridge 28 is no longer sufficient to produce the desired auxiliary voltage level. To compensate for low motor RPM operating conditions, a high frequency signal (of substantially 400 hertz) is superimposed on the motoring frequency, and this high frequency signal is used to produce the auxiliary voltage level. The frequency of the signal is high enough such that it produces no net torque on the electric motor 20 rotor.

Figure 2:
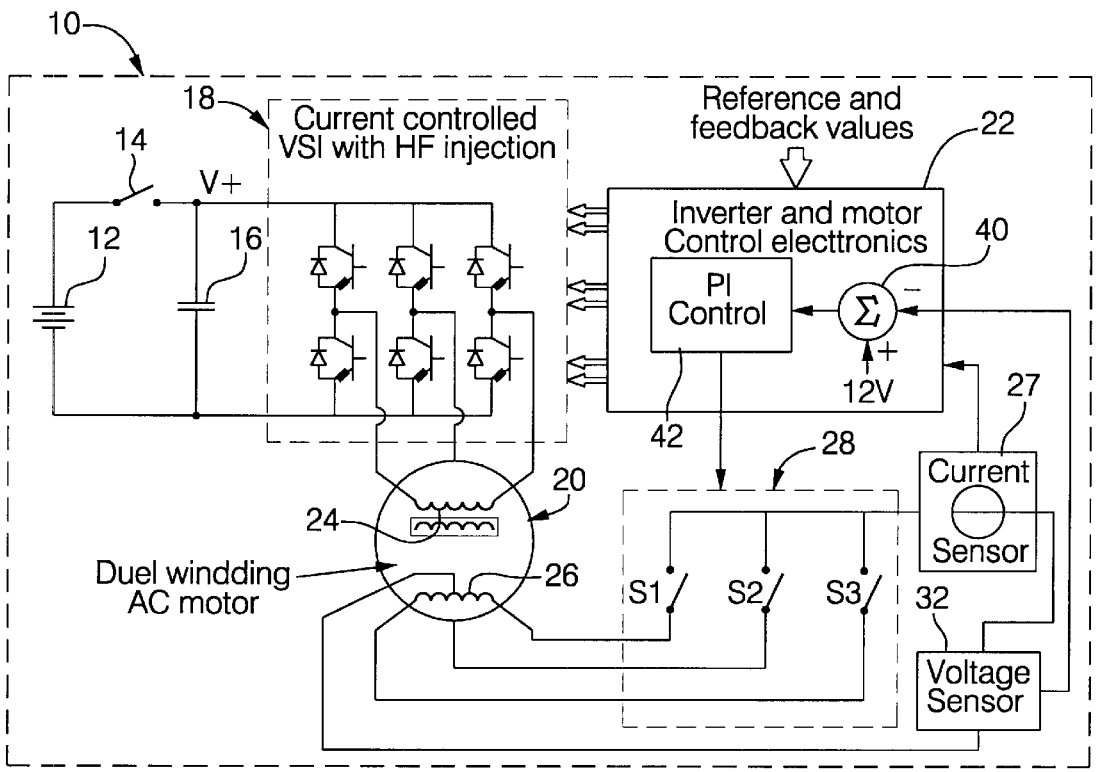
FIG. 2 is a diagrammatic drawing of an alternate embodiment of the power system of the present invention.

The present invention may also be implemented by the control circuit of FIG. 2. FIG. 2 includes the base elements of FIG. 1 with modification to the rectifier bridge 28. The rectifier bridge 20 in FIG. 2 can be implemented as a half bridge. The return current flows to the neutral connection of the secondary winding 26. The topology of FIG. 2 has the advantage that the diodes 30 are eliminated from the circuit.

While this invention has been described in terms of some specific embodiments, it will be appreciated that other forms can readily be adapted by one skilled in the art. Accordingly, the scope of this invention is to be considered limited only by the following claims.

What is claimed is:

1. A power control system for an electric vehicle comprising:

an electric fraction motor;

a first winding included in said electric traction motor for energizing said electric traction motor to rotate said electric traction motor;

at least one inverter for providing conditioned electrical power to the electric traction motor;

a DC source electrically coupled to said at least one inverter;

a second winding included in said electric traction motor for providing a voltage source in the vehicle;

a rectifier electrically coupled to said second winding to rectify said voltage source to provide a voltage output usable by accessories in the electric vehicle; and a controller, said controller controlling said rectifier in response to said output voltage.

2. The power control system of claim 1 wherein said electric traction motor is an induction motor.

3. The power control system of claim 1 wherein said DC source is a DC-DC converter.

4. The power control system of claim 1 wherein said rectified voltage source has a voltage level below 60 volts.

5. The power control system of claim 1 wherein said rectified voltage source has a voltage level of substantially 12 to 48 volts.

6. The power control system of claim 1 wherein said rectifier is a three-phase rectifier.

7. The power control system of claim 6 wherein said rectifier includes SCRs as switching elements.

8. The power control system of claim 6 further comprising a voltage sensor to detect an output voltage of said rectifier.

9. The power control system of claim 1 further comprising a controller, said controller controlling said inverter in response to current drawing by said second winding.

10. A power control system for generating a plurality of voltages in an electric motor:

a first winding included in said electric motor for providing a first voltage source for energizing the electric motor to rotate the electric traction motor;

at least one inverter for providing time-varying electrical power to the electric motor;

a DC electrical power source electrically coupled to said at least one inverter a second winding included in the electric motor for providing a second voltage source in the electric motor;

a rectifier electrically coupled to said second winding; and a controller to provide closed loop control for said rectifier based on said voltage feedback.

11. The power control system of 10 wherein said first voltage source is a three-phase high voltage source.

12. The power control system of claim 10 wherein said rectified second voltage source is a low voltage DC source.

13. The power control system of claim 10 wherein said rectified second voltage source has a voltage level of substantially 12 to 48 volts.

14. The power control system of claim 10 wherein said rectifier includes a voltage sensor to provide said voltage feedback for said rectified second voltage source.

15. A method of generating a plurality of voltages for the operation of an electric traction motor in a vehicle comprising:

providing a first set of windings in the electric traction motor;

providing a second set of winding in the electric traction motor;

providing an inverter electrically coupled to the electric fraction motor providing a time-varying output current to the electric traction motor;

providing a voltage rectifier electrically coupled to said second set of winding;

generating a first time-varying magnetic field with the first set of windings to rotate the electric traction motor in response to the time -varying output current of the inverter;

generating a time-varying current with the second set of windings in the electric traction motor in response to the output of the inverter;

detecting the voltage output by the rectifier; and controlling the rectifier in closed loop fashion with the detected voltage used as feedback.

16. The method of claim 15 further comprising the step of controlling the inverter output current in response to current draw by said second set of windings.

17. The method of claim 15 further comprising the step of said inverter generating a high frequency signal substantially equal or greater than 400 hertz.

18. A method of generating a plurality of voltages for the operation of an electric traction motor in a Vehicle comprising:

providing a first set of windings in the electric traction motor;

providing a second set of winding in the electric traction motor;

providing an inverter electrically coupled to the electric traction motor providing a time-varying output current to the electric traction motor;

providing a voltage rectifier electrically coupled to said second set of windings;

generating a first time-varying magnetic field with the first set of windings to rotate the electric traction motor in response to the time-varying output current of the inverter;

generating a time-varying current with the second set of windings in the electric traction motor in response to the output of the inverter;

compensating for a low motor RPM condition by superimposing a high frequency signal on a motoring frequency on the output of the inverter;

rectifying the second time-varying current with the voltage rectifier.

19. A method of generating a plurality of voltages for the operation of an electric traction motor in a vehicle comprising:

providing a first set of windings in the electric traction motor;

providing a second set of winding in the electric traction motor;

providing an inverter electrically coupled to the electric traction motor providing a time-varying output current to the electric traction motor;

providing a voltage rectifier electrically coupled to said second set of windings;

generating a first motoring frequency with the inverter to drive the electric fraction motor;

generating a second frequency that does not substantially effect the torque of the electric traction motor superimposed on the first motoring frequency;

generating a first time-varying magnetic field with the first set of windings to rotate the electric traction motor in response to the time-varying output current of the inverter;

generating a time-varying current with the second set of windings in the electric traction motor in response to the output of the inverter;

rectifying the second time-varying current with the voltage rectifier.

20. A method of generating a plurality of voltages for the operation of an electric traction motor in a vehicle comprising:

providing a first set of windings in the electric traction motor;

providing a second set of winding in the electric traction motor;

providing a controller with executable software;

providing an inverter electrically coupled to the electric traction motor providing a time-varying output current to the electric fraction motor;

providing a voltage rectifier electrically coupled to said second set of windings;

generating a first time-varying magnetic field with the first set of windings to rotate the electric traction motor in response to the time-varying output current of the inverter;

generating a time-varying current with the second set of windings in the electric traction motor in response to the output of the inverter;

rectifying the second time-varying current with the voltage rectifier under control of the software.

21. The method of claim 20 further comprising rectifying the second time varying current with a proportional integral control software.

* * * * *